H. S. VAN PATTEN.
COOKING UTENSIL.
APPLICATION FILED JUNE 26, 1908.
904,382.
Patented Nov. 17, 1908.
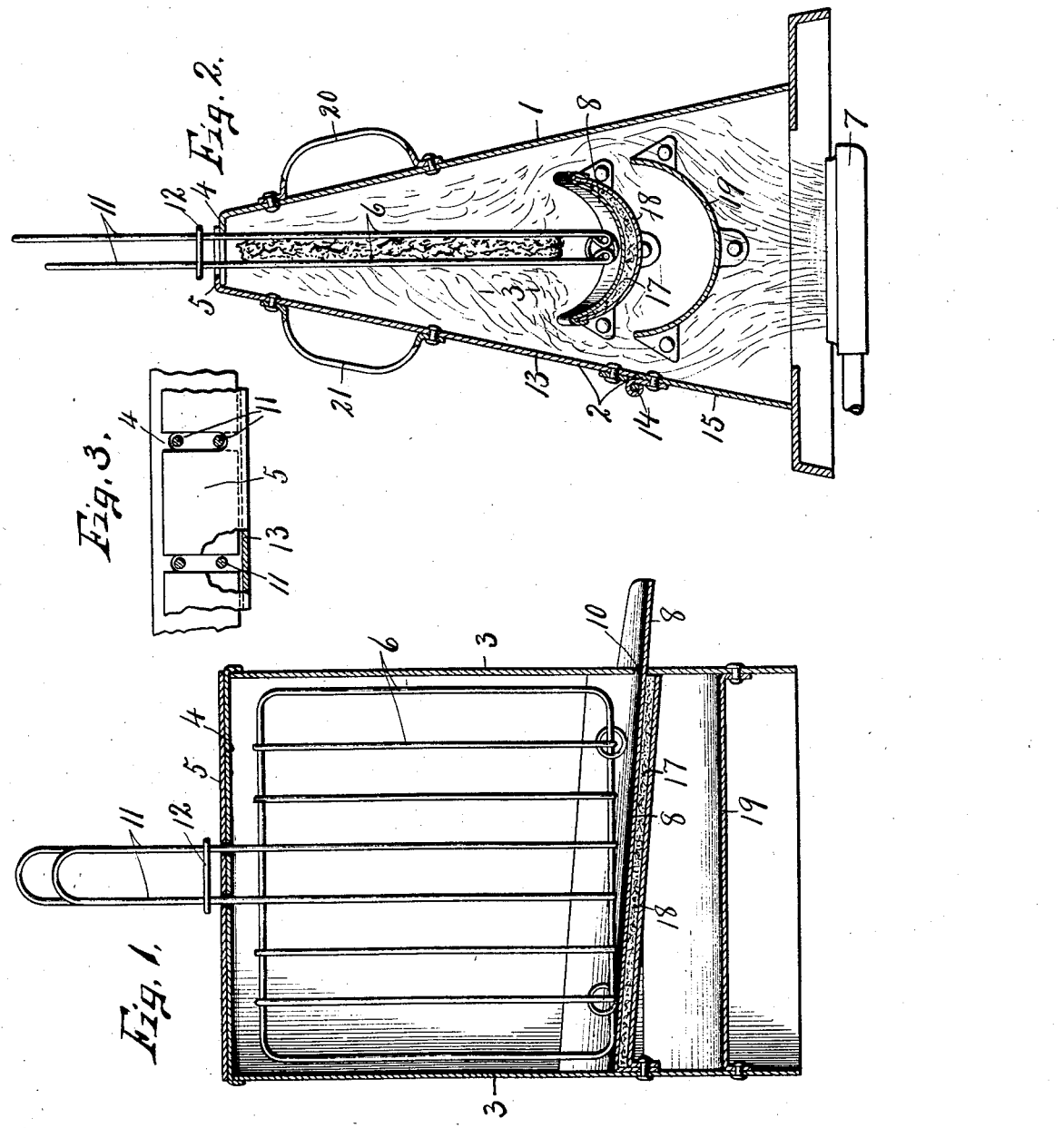
Witnesses
A. C. Thomas
H. E. Chau
Inventor.
H. S. Van Patten
By
Howard P. Denison
Attorney.

UNITED STATES PATENT OFFICE.

HORACE S. VAN PATTEN, OF SYRACUSE, NEW YORK.

COOKING UTENSIL.

No. 904,382.  Specification of Letters Patent.  Patented Nov. 17, 1908.

Application filed June 26, 1908. Serial No. 440,566.

*To all whom it may concern:*

Be it known that I, HORACE S. VAN PATTEN, of Syracuse, in the county of Onondaga, in the State of New York, have invented new and useful Improvements in Cooking Utensils, of which the following, taken in connection with the accompanying drawings, is a full, clear, and exact description.

This invention relates to certain improvements in cooking utensils and refers more particularly to a broiling device adapted to be used in connection with any suitable heater, preferably a gas burner, for broiling steaks and other meats, although it is equally applicable for toasting bread and for treating other edibles in which it is desired to apply the heat simultaneously and uniformly to both sides of the article to be broiled, roasted or toasted.

The object is to divert or distribute the heat uniformly and simultaneously against both sides of the article to be broiled, roasted or toasted whereby such article may be more expeditiously and uniformly cooked to the desired degree and at the same time to provide means for collecting and carrying off the drip or moisture from such articles.

Another object is to prevent as far as practicable the escape of moist vapor, smoke and accompanying odors into the room in which the heater and broiler are located.

A further object is to provide means whereby the attendant may readily observe the broiling or toasting process without removing or otherwise disturbing the receptacle for the article being broiled or toasted.

A still further object is to prevent ignition of the inflammable fats or oils which may escape from the meats during the process of broiling.

Other objects and uses relating to specific parts of the device will be brought out in the following description.

In the drawings—Figures 1 and 2 are longitudinal and transverse vertical sectional views of a broiling device embodying the various features of my invention. Fig. 3 is an enlarged top plan of a portion of the top of the broiler seen in Figs. 1 and 2 showing the slotted overlapping flanges for receiving the portions of the handle of the steak holder.

For convenience and brevity of description, the device will be hereafter termed a "meat broiler" with the understanding that it is equally applicable for roasting and toasting bread and other edibles.

As shown in the drawings, this broiler comprises essentially a sheet metal shell composed of upwardly tapering sides —1— and —2—, vertical end pieces —3— and top flanges —4— and —5— constituting a neat, light and compact receptacle which is easily portable and adapted to receive a steak or meat holder —6— of the usual well known wire construction. This shell or receptacle is shallow transversely as compared with its length but gradually diminishes in width from the bottom upward so that its upwardly tapering front and rear sides will serve as deflecting plates to divert the heat from the sides toward the center of the shell where the steak or other meats are designed to be supported in a manner hereinafter described. The lower end of the shell or receptacle is open and of sufficient area to cap or cover the heater as the burner —7— of the gas range or plate.

A drip conduit or trough —8— is secured centrally within the shell some distance above its bottom and extends lengthwise thereof from end to end in an inclined plane to carry off the drip or moisture which may be precipitated during the process of broiling a steak or other meat, said trough being preferably secured at one end to one of the ends —3— of the shell while its opposite end extends some distance beyond the opposite side of the shell through a suitable opening —10—. This conduit is preferably made of sheet metal concavo-convex in cross section with its concave side uppermost and is of less transverse width than the distance between the sides —1— and —2— at the plane in which the conduit is located so as to allow the flame or heated products of combustion to pass upwardly around the sides thereof.

The meat holder —6— may be of any well known grid-construction usually consisting of two wire grids hinged together at their lower ends and terminating at their upper ends in suitable handles —11— which are locked together by a wire ring or loop —12—.

The greater portion of the front side of the shell of the broiler is movable and constitutes a door —13— hinged at its lower end at —14— to a fixed portion —15— while its upper end is provided with the horizontal rearwardly projecting flange —5— lapping in this instance upon the upper face of the horizontal inwardly projecting flange —4— on the rear side —1— of the shell so as to confine as far as possible the moist vapor and fumes within the shell when the door —13— is closed, said flanges being provided with registering slots opening from their edges to receive the adjacent portions of the handle —11—, the sides of the slots serving to retain the meat holder in operative position against lateral movement.

This meat holder is first placed within the shell through the opening formed when the door —13— is opened and its lower end is supported upon the upper face of the conduit —8—, which holds it against downward movement, portions of the handle —11— being inserted into the slots of the flange —4— while the remaining portions of said handle project some distance above said flange to the exterior of the shell where they are protected from overheating thus permitting the operator to handle the meat holder without liability of injury by burning.

When the meat holder is supported centrally upon the drip conduit —8— in the manner just described, the door —13— is closed causing the slots of its flange —5— to register with those in the flange —4— for receiving the adjacent portions of the handles —11—.

The drip conduit —8— is protected against overheating by a suitable shield —17— of asbestos or other heat insulating material which is held in place against the underside of the conduit by a retaining plate —18— of sheet metal, the latter being secured to the lengthwise edges of the drip conduit —8— by any suitable form of seam or other attaching means. As a further means of protecting the drip conduit —8— against overheating, I provide an additional baffle plate —19— also of sheet metal located some distance below the lower side of the retainer plate —18— leaving an intervening air space between the plates —18— and —19— for the circulation of air therethrough, said plate —19— being secured at its ends to the opposite ends of the shell as clearly shown in Fig. 1. This plate —19— is also of less transverse width than the interior width of the adjacent portion of the shell from front to rear leaving ample space for the passage of the products of combustion or heat upwardly around the sides thereof. This baffle plate —19— and also the retainer plate are concavo-convex in cross section with their convex sides at the bottom thus constituting means for deflecting the heated products of combustion laterally and upwardly against the front and rear sides of the shell, which in turn deflect the flame or heat inwardly toward the center of the shell and against opposite sides of the meat which may be retained in the holder —6—.

In order that the entire device may be easily handled or carried from place to place, the front and rear side are provided with suitable handles —20— and —21—, the latter serving also as means for opening and closing the door —13— which is hinged preferably in a plane below the drip conduit —8— so that at any time the entire surface of the stake in the broiler may be observed.

What I claim is:

1. In a cooking utensil of the type described, a sheet metal shell comprising side and end walls, the side walls being arranged at an incline to the vertical and converging towards each other at their upper ends, and each having an inwardly projecting slotted flange at said upper end, the flanges overlapping and the slots in one flange registering with the slots in the other flange, one of said side walls being in two parts hinged together, an inclined drip trough mounted within the shell and projecting beyond one end of the latter, said drip trough having its longitudinal edges spaced away from the side walls of the shell, a heat resisting shield inclosing the base of said drip trough, and a concavo-convex baffle plate supported by the end walls of the shell and disposed beneath the drip trough with its longitudinal edges spaced away from the side walls of the shell.

2. In a cooking utensil of the character described, a sheet metal shell open at its lower end and substantially closed at its upper end, said shell comprising side walls and end walls, the side walls inclining from their lower edge to their upper edge, and each provided at their upper edge with an inwardly projecting slotted flange, the flange of one wall overlapping the flange of the other wall and the slots in said flanges being in registry, one of said side walls being in two parts hinged together, and an inclined drip trough mounted within the shell with one end projecting beyond one end of the shell, said drip trough having its longitudinal edges spaced from the side walls of the shell and being provided on its underneath face with a lining of heat resisting material.

In witness whereof I have hereunto set my hand this 23d day of June 1908.

HORACE S. VAN PATTEN.

Witnesses:
 H. E. CHASE,
 CAROLINE McCORMACK.